United States Patent
Svensson

(10) Patent No.: US 6,520,104 B1
(45) Date of Patent: Feb. 18, 2003

(54) ARRANGEMENT AND METHOD FOR DYNAMIC CONTROL OF THE MOVEMENTS AND COURSE OF A HIGH-SPEED SHIP HULL

(75) Inventor: Björn Svensson, Hälsö (SE)

(73) Assignee: LA.ME Srl, Opera (MI) (IT)

( * ) Notice: Subject to any disclaimer, the term of this patent is extended or adjusted under 35 U.S.C. 154(b) by 0 days.

(21) Appl. No.: 09/623,387

(22) PCT Filed: Mar. 1, 1999

(86) PCT No.: PCT/SE99/00285

§ 371 (c)(1),
(2), (4) Date: Dec. 8, 2000

(87) PCT Pub. No.: WO99/44885

PCT Pub. Date: Sep. 10, 1999

(30) Foreign Application Priority Data

Mar. 2, 1998 (SE) .............................................. 9800643

(51) Int. Cl.⁷ .............................................. B63H 25/00
(52) U.S. Cl. .................................................. 114/144 R
(58) Field of Search .............................. 114/145 R, 126, 114/144 R; 440/38

(56) References Cited

U.S. PATENT DOCUMENTS

| | | | | |
|---|---|---|---|---|
| 254,878 A | * | 3/1882 | Little ...................... | 114/145 R |
| 667,482 A | * | 2/1901 | Albarda ................... | 114/145 R |
| 3,159,134 A | * | 12/1964 | Winnen .................... | 114/45 R |
| 5,193,478 A | | 3/1993 | Mardikian | |
| 5,231,946 A | * | 8/1993 | Giles ........................... | 114/56 |

FOREIGN PATENT DOCUMENTS

| | | |
|---|---|---|
| GB | 332315 | 7/1930 |
| WO | WO 96/20105 | 7/1996 |

* cited by examiner

*Primary Examiner*—Ed Swinehart
(74) *Attorney, Agent, or Firm*—Finnegan, Henderson, Farabow, Garrett and Dunner, L.L.P.

(57) ABSTRACT

The invention relates to an arrangement and a method for dynamic control of the movements and course of a high-speed vessel hull (100). The arrangement (101) comprises propulsion members (102, 102') and at least one flap member (104, 104', 104", 104'''). In this connection, the flap member is arranged so as to be capable of being brought adjustably at an angle (105) in relation to a water flow (106) relative to an aft side surface (107) of the vessel hull (100) in order in this connection to generate force components (108, 109) which act on said vessel hull (100) and on a front side (110) of the flap member (104), the flap member (104) being arranged so that the force components (108, 109) generated are directed on the one hand towards the aft side surface (107) of the vessel hull and on the other hand towards the front side (110) of the flap member (104) in the water flow (106) relative to the aft side surface (107) so as in this way to be capable of bringing about a change in the movements and/or course of the vessel hull (100). The invention is particular intended for manoeuvring vessel hulls of high-speed vessels of the type which are provided with water-jet drive, that is to say vessels with a water-free stem while in motion, but can also be applied to other types of high-speed vessels.

9 Claims, 4 Drawing Sheets

ARRANGEMENT AND METHOD FOR DYNAMIC CONTROL OF THE MOVEMENTS AND COURSE OF A HIGH-SPEED SHIP HULL

TECHNICAL FIELD

The present invention relates to an arrangement and a method for dynamic control of the movements and course of a high-speed vessel hull. The invention consists in that movable flap members are arranged at one or more transitions between the stern of the vessel and aft side portions of the vessel so as to be capable of being moved out in the lateral direction of the vessel hull and in this connection generate force components which act essentially in the lateral direction of the vessel hull. The invention also relates to a method for dynamic control of the movements and course of a high-speed vessel hull.

The invention is intended in particular for manoeuvring vessel hulls of high-speed vessels of the type which are provided with water-jet drive, that is to say vessels with a water-free stem while in motion. Examples of such vessels are passenger ferries of single-hull or multi-hull type.

The invention can, however, also be applied to other types of high-speed vessel than passenger ferries, and also to smaller high-speed boats if desired. It is also possible to use the invention for vessels or boats which are driven in other ways than by water-jet units.

STATE OF THE ART

The use of high-speed vessels for more efficient transport of cargo, vehicles and passengers has today become increasingly widespread. A common type of such high-speed vessel is passenger ferries of the single-hull or catamaran type, which are often driven and steered by means of what are known as water-jet units.

It is previously known that high-speed vessels of the type in question can be associated with certain problems, such as pitching and rolling tendencies and also difficulties in maintaining the correct floating position while in motion. A contributory cause of such problems, for example with regard to passenger ferries, is that the load distribution between different journeys and/or trips can vary greatly depending on the number of cars and passengers and their positioning on board.

Various arrangements, such as hydrofoils and trimming flaps, which strive to counteract pitching and rolling tendencies and to maintain the correct floating position of the vessel hull while in motion, have therefore been known for a long time.

In this way, SE-C2-502 671 describes an arrangement for a planing or semi-planing vessel hull for trimming the floating position of the hull while in motion. The arrangement described in SE-C2-502 671 comprises a flap introduced, directly behind the bottom of the hull, into the relative water flow and transversely thereto to generate an eddy with an upwardly and forwardly directed force component in front of the flap, as a result of which a volume of water of increased pressure is created, which acts against a zone of the bottom of the vessel in front of the flap. The flap of the arrangement described is continuously adjustable to suitable depth by means of movement-transmitting members and vertically displaceably mounted in the lower edge of the stem of the hull. The arrangement described in SE-C2-502 671 is said to make possible continuous dynamic trimming of a high-speed vessel hull to counteract rolling and pitching movements while in motion. Different embodiments of the arrangement described are said to be capable of replacing either a movable trimming foil, a rigidly arranged trimming foil, or a wedge arranged below the aft part of the bottom.

A specific problem associated with modern high-speed vessels of the type which is usually operated by water-jet drive is that they tend to not have very good course stability. In the case of heavy seas from the stem, there is a certain risk that the manoeuvrability will be lost momentarily and the bow of the vessel will veer out to one side from the intended course (broach).

A previously proposed solution to this problem is to use keels, centre-boards and other "drift-braking" arrangements, with the aid of which it is possible to bring about better course stability. However, such previously known arrangements result in increased water resistance which leads to either a reduction in speed with maintained shaft power or increased fuel consumption at maintained speed because the shaft power must be increased in order to compensate for the increased resistance. Furthermore, such previously known arrangements for increasing course stability in general make manoeuvring of the vessel in the lateral direction more difficult.

Steering of waterjet-driven vessels is effected by controlling the direction of the water jet using course-changing means in the form of rotatable nozzles and/or rotatable shutter-like or scoop-like members. The dimensions of these course-changing means must be adapted so as to provide sufficient course-changing effect both at low speeds, such as when the vessel is within a harbour area, and when travelling at full speed. A certain "overdimensioning" is necessary then so as to ensure sufficient course-changing capacity in all possible situations. It is therefore not desirable to improve the course stability unilaterally at the expense of the manoeuvrability of this type of high-speed vessel.

DESCRIPTION OF THE INVENTION

A first object of the present invention is therefore to provide an arrangement for dynamic control of the movements and course of a high-speed vessel hull, which arrangement improves both the course stability and the manoeuvrability and also counteracts pitching and rolling tendencies of a high-speed vessel hull without resulting in any losses in speed.

This object is achieved by means of an arrangement, which comprises propulsion members and at least one flap member which is arranged so as to be capable of being brought adjustably at an angle in relation to a water flow relative to an aft side surface of the vessel hull in order in this connection to generate force components acting on said vessel hull and on a front side of said flap member, which side faces towards the water flow. According to the invention, the flap member is arranged so that, when the movements and/or course of the vessel hull change(s), the force components generated are directed on the one hand towards the aft side surface of the vessel hull and on the other hand towards the front side of the flap member in the water flow relative to the aft side surface.

A further object of the invention is to provide an improved method for dynamic control of the movements and course of a high-speed vessel hull. This object is achieved by means of a method, which comprises use of propulsion members and flap members with a front side. At least one flap member is at least partly introduced, while the vessel is in motion, into a water flow relative to the vessel hull, with the front side facing towards the water flow in order to generate force components acting on the vessel hull and on the flap member, the water flow comprising a volume of water below a water surface and the volume of water being under pressure. According to the invention, the flap member, when introduced into the water flow, increases the pressure of the volume of water, the increased pressure giving rise to the force components which are directed on the one hand towards the aft side surface and on the other hand in the direction of the front side of the flap member introduced.

Compared with the previously known technique of improving dynamic control of the movements and course of high-speed vessels, a number of advantages are achieved by means of the present invention, such as reduced energy losses and reduced loads on, for example, a waterjet unit because this can be kept in a "fixed" position and does not have to be used to steer the vessel while travelling at high speeds.

By virtue of the invention, the conventional steering, reversing and manoeuvring equipment of the vessel has to dimensioned only for travelling at low speeds. In the case of water-jet drive, the conventional system of steering the vessel is used only at speeds below around 15–20 knots, while the water-jet unit only functions as a propulsion unit at higher speeds.

The invention also makes possible a dynamic control/adjustment which results in smoother motion and which can take account of and counteract rough seas, and a reduced water resistance against the vessel hull which can lead to significant savings in terms of fuel or, alternatively, time. By virtue of the dynamic adjustment/control, the invention makes it possible for the vessel to travel at higher speed in, for example, heavy seas.

The control can also be based on various "comfort"-related parameters so that the passengers on the vessel experience smooth motion with a high degree of comfort even in rough weather.

The invention also provides increased safety because it allows maintained controllability of the vessel even if, for example, a water-jet unit should break down while travelling at high speed.

Advantageous embodiments of the invention emerge from the dependent patent claims below.

BRIEF DESCRIPTION OF THE DRAWINGS

The invention will be described in greater detail below with reference to a preferred exemplary embodiment and the appended drawings, in which.

PREFERRED EMBODIMENTS

Figure 1:
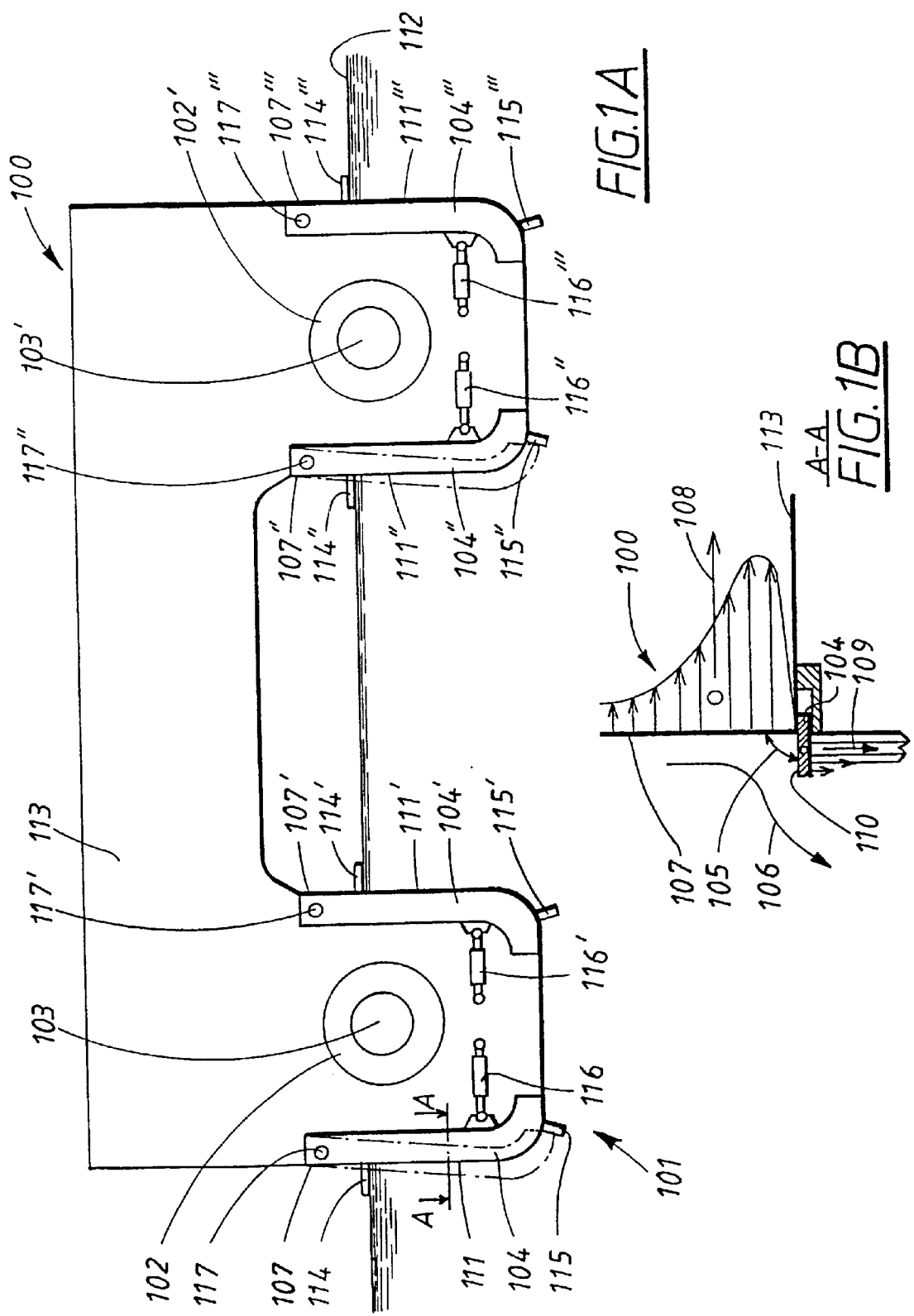
FIG. 1A shows a diagrammatic plan view from the rear of a high-speed vessel of the catamaran type, which is equipped with an arrangement according to a first preferred embodiment of the invention.
FIG. 1B shows diagrammatically the force distribution, created by the water flowing past, around one rear corner of the vessel, seen from above along the section A—A in FIG. 1A.

FIGS. 1A and 1B show diagrammatically a high-speed vessel with a hull 100 of the catamaran type, an arrangement 101 according to a first preferred embodiment of the invention having been arranged in association with the stern of the vessel. In the first embodiment, the vessel is provided with two propulsion members 102, 102' with course-changing means 103, 103' which consist of two water-jet units with rotatable nozzles and scoop-shaped members for directing the water jets. It is possible, however, to envisage embodiments of the arrangement according to the invention in which no course-changing means 103, 103' are present.

In the first embodiment, the arrangement 101 comprises four flap members 104, 104', 104", 104"' which are all arranged so as to be capable of being brought adjustably at an angle 105 in relation to a water flow 106 relative to an aft side surface 107 of the vessel hull 100.

In the first embodiment, a flap member 104, 104', 104", 104"' is arranged at four different transitions between the stern 113 of the vessel hull 100 and four different aft side surfaces 107, 107', 107", 107"' of the vessel hull 100. The function of the flap members is then, in the actuated state, to generate force components 108, 109 which act on the vessel hull 100 and on a front side 110 of the respective actuated flap member 104, which side faces towards the water flow 106.

According to the invention, each flap member 104, 104', 104", 104"' is arranged so that the force components 108, 109 generated are directed on the one hand towards the aft side surface 107 of the vessel hull and on the other hand towards the front side 110 of the flap member 104 in the water flow 106 relative to the aft side surface 107. This characteristic situation of the invention is illustrated diagrammatically in appended FIG. 1B and makes it possible for the movements and/or course of the vessel hull 100 to be changed in the desired manner.

In particularly preferred embodiments, the arrangement according to the invention is arranged on high-speed vessels with water-jet drive, but embodiments of the invention in which the high-speed vessel uses another type of drive are also possible.

In another preferred embodiment of the arrangement according to the invention, the propulsion members 102, 102' are provided with course-changing means 103, 103' and comprise two water-jet units. In this embodiment, the vessel hull 100 has four aft side surfaces 107, 107', 107", 107"' with underwater portions 111, 111', 111", 111"' which are situated below the water surface 112 while the vessel is in motion.

In the embodiment described, all four aft side surfaces 107, 107', 107", 107"' form transitions to the stern 113 of the vessel hull 100, a flap member 104, 104', 104", 104"' being arranged at each such transition. According to this embodiment, each flap member 104 is arranged so as to be capable of being adjusted while the vessel is in motion from being, seen directly from the rear, essentially in line with the plane 107 of the aft side surface to being essentially projecting at right angles from the plane of said aft side surface 107.

In a particularly preferred embodiment of the invention, the flap member 104, 104', 104", 104"' extends in the vertical direction along a considerable part of the plane 107, 107', 107", 107"' of the aft side surfaces and along the plane of the entire underwater portions 111, 111', 111", 111'". In this way, a strong course-changing effect is obtained when one or more flaps are moved out.

In a further embodiment of the invention, the arrangement also comprises a spray strip 114, 114', 114", 114'" and a fin 115, 115', 115", 115'" arranged on the vessel hull 100. In this embodiment, the spray strip 114, 114', 114", 114'" is arranged so as, while the vessel is in motion, to form an angle with the flap member 104, 104', 104", 104'" above the water surface 112. The spray strip prevents water splashing upwards towards the deck of the vessel and also makes it possible for the force components 108, 109 to be influenced and optimized in order to produce the desired effect. In the embodiment described, a fin 115, 115', 115", 115'" is also arranged so as, while the vessel is in motion, to form an angle with the flap member 104, 104', 104", 104'" below the water surface 112. The fin 115, 115', 115", 115'" makes it possible for the force component 109 acting on the flap member 104 to be influenced, so that it can be boosted and optimized.

Particularly preferred embodiments of the arrangement also include one or more movement members 116, 116', 116", 116'" which are arranged so as to adjust the position of the respective flap members 104, 104', 104", 104'" while the vessel is in motion. The movement member or movement members advantageously consists or consist of hydraulic arrangements of a type known per se. As will be clear to the expert, a great many different alternative constructions are possible with regard to the movement members.

Although, according to the invention, an arrangement comprising only one flap member is possible, the arrangement 101 preferably comprises at least two flap members 104, 104" which are arranged so as to provide together dynamic control of the movements and/or course of the vessel hull 100. As far as multi-hull vessels are concerned, for example vessel hulls of the catamaran type, flap members are advantageously arranged on all the aft side surfaces and in such a manner that in the case of, for example, a change of course to port, a first flap member 104 on an outer aft side surface 107 of the vessel hull interacts with a third flap member 104" arranged on an inner aft side surface 107". In the case of a change of course to starboard, on the other hand, the opposite flap members 104'" and 104' will be actuated.

In particularly preferred embodiments of the arrangement according to the invention, the flap member or flap members 104, 104', 104", 104'" is or are arranged so as to interact with the propulsion member 103, 103' and/or the course-changing means 104, 104' in the dynamic control of the movements and/or course of the vessel hull 100.

The arrangement according to the invention has been described above with reference to FIGS. 1A and 1B, the flap members 104, 104', 104", 104'" being arranged so as, when moved out/actuated, to be rotated about bearing points 117, 117', 117", 117'" arranged in the horizontal direction. However, embodiments are also possible, in which the flap members of the arrangement according to the invention are not arranged rotatably but are instead displaced linearly when moved out/actuated.

Figure 2:
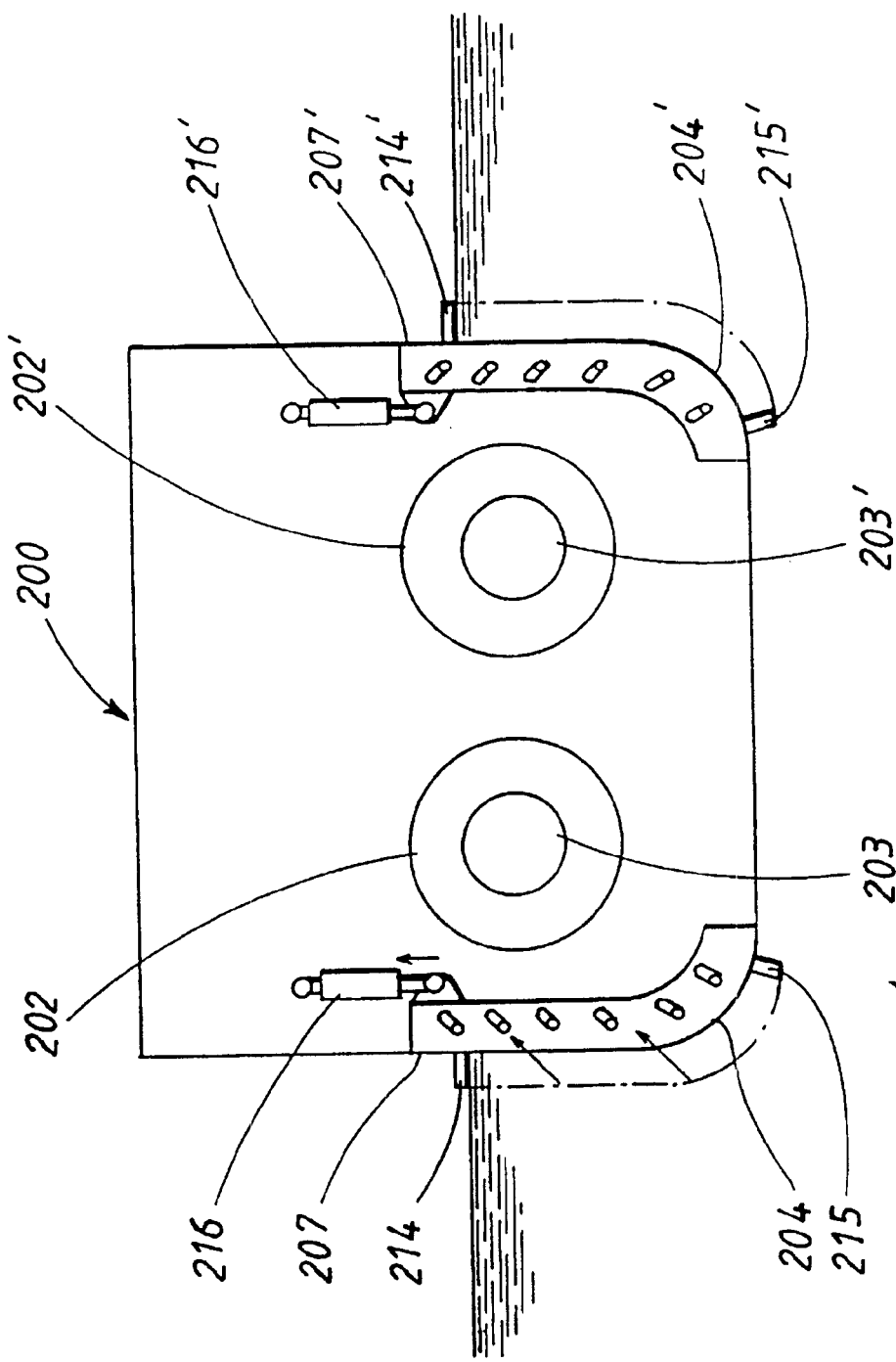
FIG. 2 shows a diagrammatic view from the rear of a high-speed vessel hull equipped with an arrangement according to a second embodiment of the invention.

Such an embodiment is shown in FIG. 2, the arrangement according to the invention in this case being arranged on a single-hull vessel 200. In this embodiment, the arrangement comprises two propulsion members 202, 202' in the form of water-jet units with course-changing means 203, 203' in the form of rotatable nozzles. In the embodiment described, the arrangement comprises only two flap members 204, 204' which are arranged so as to be capable of being brought adjustably at an angle in relation to a water flow relative to aft side surfaces 207, 207' of the vessel hull 200 by means of two hydraulic movement means 216, 216'. In the embodiment described, the arrangement 201 also comprises spray strips 214, 214' and fins 215, 215'. The flap members 204, 204' in the embodiment described are arranged so as to be capable of being displaced linearly at an angle downwards/outwards, instead of being rotated about a horizontally arranged bearing point as discussed previously in connection with FIG. 1A.

Figure 3:
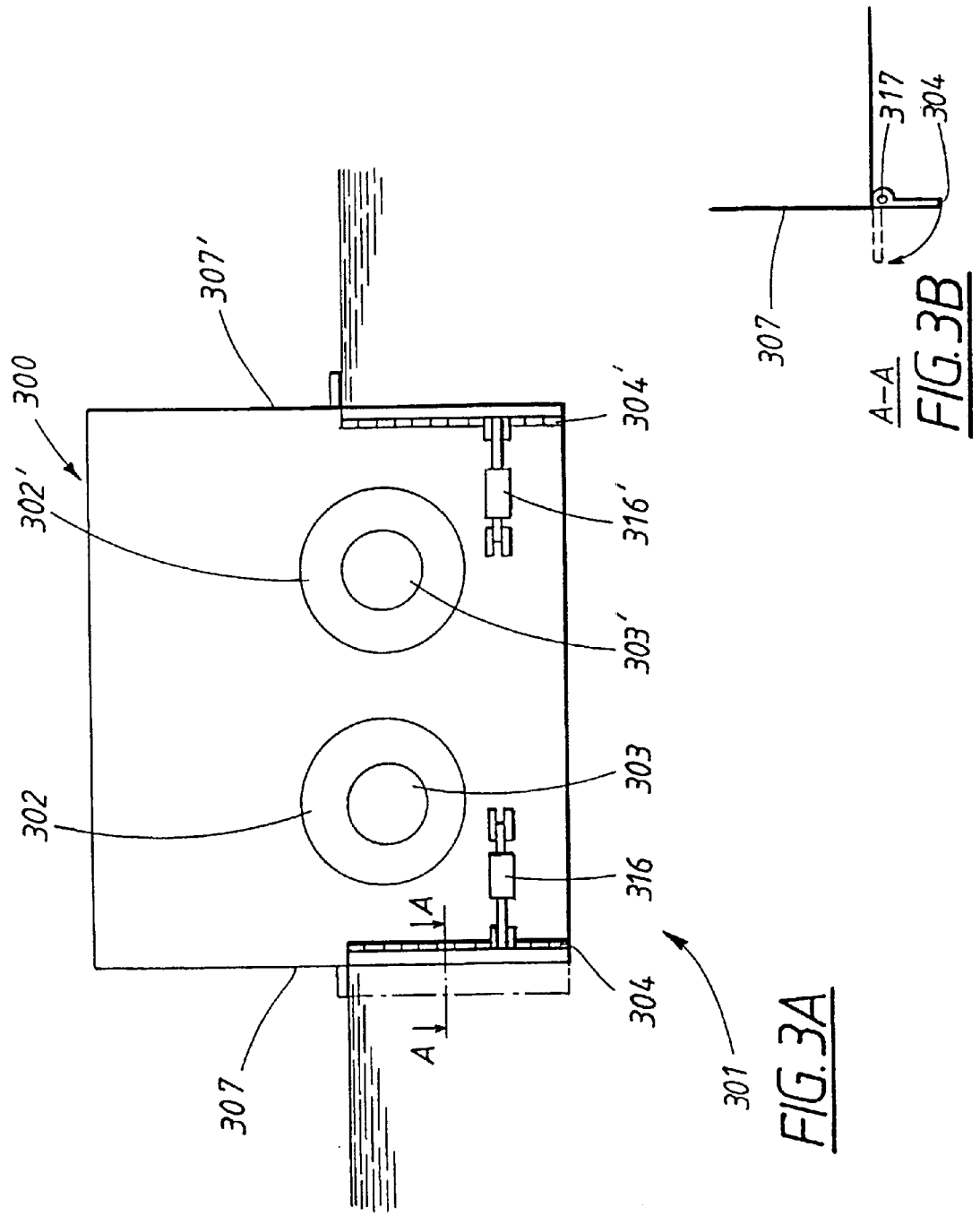
FIG. 3A shows a diagrammatic plan view from the rear of another high-speed vessel which is equipped with an arrangement according to a third embodiment of the invention.
FIG. 3B shows diagrammatically one rear corner of the vessel shown in FIG. 3A, seen from above along the section A—A in FIG. 3A.

FIGS. 3A and 3B illustrate a further advantageous embodiment of the arrangement according to the invention arranged on a single-hull vessel 300. In this embodiment, the arrangement comprises two propulsion members 302, 302' in the form of waterjet units with course-changing means 303, 303' in the form of rotatable nozzles. In the embodiment described, the arrangement comprises only two flap members 304, 304' which are arranged so as to be capable of being brought adjustably at an angle in relation to a water flow relative to aft side surfaces 307, 307' of the vessel hull 300 by means of two hydraulic movement means 316, 316'. In the embodiment described, the arrangement 304 also comprises spray strips 314, 314' and fins 315, 315'.

The flap members 304, 304' in the embodiment illustrated in FIGS. 3A and 3B are arranged rotatably about a vertical bearing point 317 so as to be capable of being pivoted out to the sides instead of being rotated about a horizontal bearing point as discussed previously in connection with FIG. 1A or displaced linearly as shown in FIG. 2.

Figure 4:
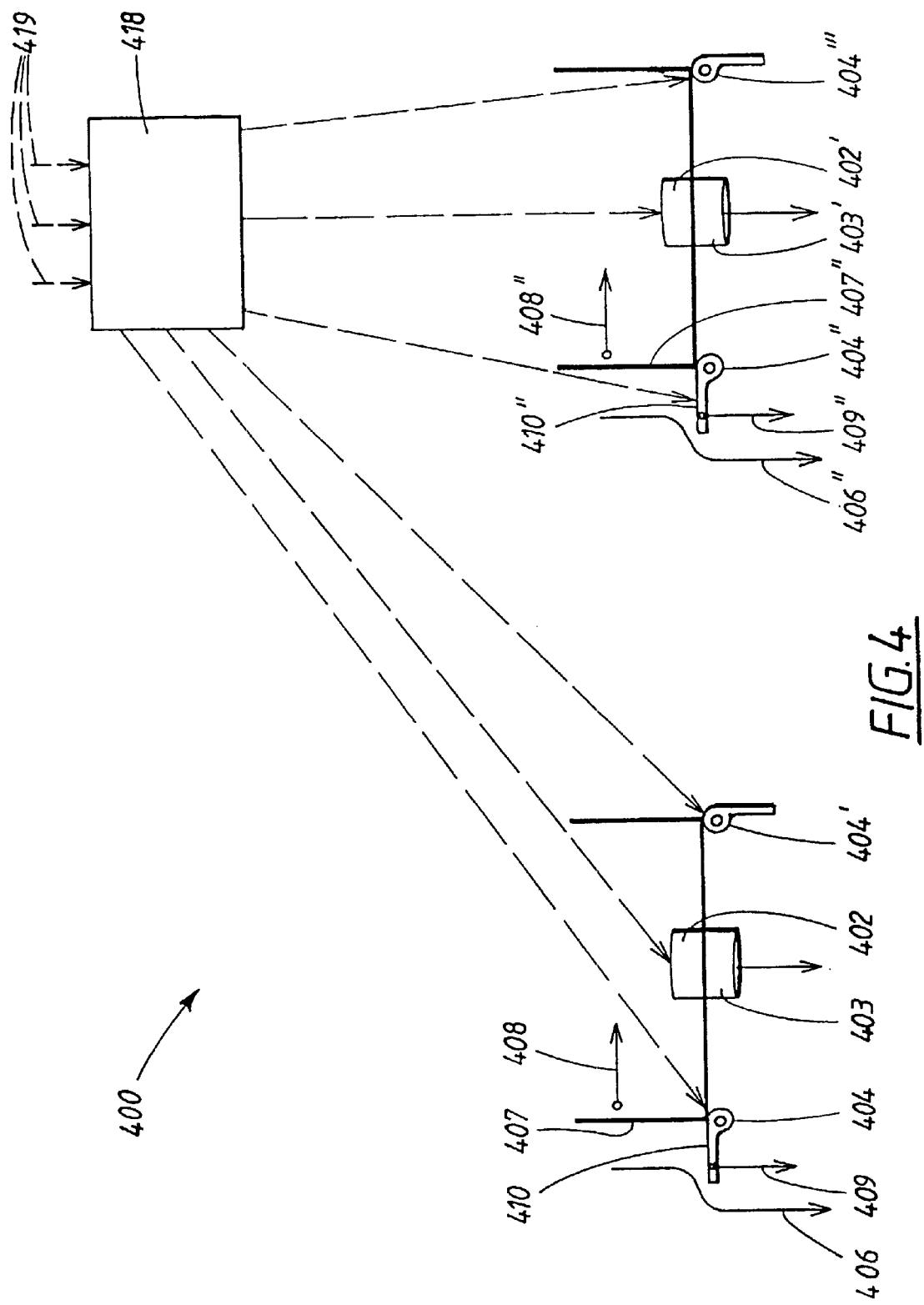
FIG. 4 shows a simplified basic diagram of an arrangement according to the invention for the purpose of illustrating an embodiment of a method according to the invention.

A method for dynamic control of the movements and course of a high-speed vessel hull according to the invention will be described below with reference to FIG. 4. FIG. 4 illustrates diagrammatically a vessel hull 400 of the catamaran type which is provided with an arrangement according to the invention with rotatable flap members 404, 404', 404", 404'". The arrangement according to the invention shown in FIG. 4 is in a state of turning to port while travelling at high speed.

According to a first preferred embodiment of the invention, the method comprises use of propulsion members 402, 402' with course-changing means 403, 403' and flap members 404, 404', 404", 404'" with a front side 410, 410". While the vessel is in motion, the flap members 404, 404" are introduced into a water flow 406, 406" relative to the vessel hull 400, with the front sides 410, 410" facing towards the water flow 406, 406" so as to generate force components acting on the vessel hull 400 and on the flap members 404, 404". In this connection, the water flow 406, 406" comprises a volume of water below a water surface, the volume of water being under pressure. According to the invention, the flap members 404, 404" introduced into the water flow increase the pressure of the volume of water, the increased pressure giving rise to force components 408, 408", 409, 409" which are directed on the one hand towards the aft side surfaces 407, 407" and on the other hand in the direction of the front sides 410, 410" of the flap members 404, 404" introduced and, as a result, a change in the movements and/or course of the vessel hull 400 is brought about.

In another preferred embodiment of the method according to the invention, use is made of propulsion members 402, 402' and course-changing means 403, 403' which comprise water-jet units, the method also comprising use of movement members (not shown in FIG. 4). In the embodiment described, the movement members are hydraulic and adjust the position of the flap members 404, 404', 404", 404''' while the vessel is in motion.

In particularly preferred embodiments of the method according to the invention, at least two flap members 404, 404", on at least two aft side surfaces 407, 407", interact in the dynamic control of the movements and/or course of the vessel hull 400.

In a further preferred embodiment of the method according to the invention, the flap members 404, 404', 404", 404''' interact with propulsion means 403, 403' and/or course-changing means 404, 404' in the dynamic control of the movements and/or course of the vessel hull 400.

In a particularly preferred embodiment of the method according to the invention, the movements and/or course of the vessel hull 400 is or are controlled dynamically while in motion via a control system 418 on the basis of input parameters 419 selected from the group including weather conditions, sea conditions, the type of vessel hull 400, speed or position, the acceleration of the vessel hull in any one of the six degrees of freedom and/or the comfort of the passengers. In this respect, the control system 418 can be of a type previously known per se. The six degrees of freedom mean in this context the different movement patterns known as roll, pitch, yaw, sway, heave and surge.

The invention is not limited to the embodiments described above, or to what is shown in the appended figures, but can be varied within the scope of the patent claims below.

What is claimed is:

1. An arrangement for dynamic control of the movements and course of a high-speed ship, the arrangement comprising:
    a high-speed ship hull having at least a stern and an aft side surface;
    at least one propulsion member to propel the hull at a speed in excess of 15 knots;
    at least one spray strip and at least one fin; and
    means including at least one flap member having a front surface facing forward of the ship hull for generating water flow force components acting toward the ship hull and toward the front side of the flap member to bring about a change in the movement or course of the ship while the ship is moving at a speed of at least 15 knots,
    the flap member being adjustable so that in a deployed position, the front surface is at an angle in relation to water flow relative to the aft side surface of the ship hull,
    the at least one spray strip, while the ship is in motion, forming an angle with the flap member above the water surface to prevent water splashing upwards and to influence the force component that act on the flap member and the ship hull, and
    the fin, while the ship is in motion, forming an angle with the flap member below the water surface to influence the force components acting on the flap member.

2. The arrangement of claim 1, wherein the propulsion member is provided with a water-jet unit for changing course;
    the ship hull has more than two aft side surfaces, each with an underwater portion submerged below a water surface while the ship is in motion;
    at least two of the aft side surfaces form, at one end, transitions to the stern of the ship hull; and
    the flap member is adjustable, while the ship is in motion, between a non-deployed position, substantially in line with the aft side surface and the deployed position, projecting substantially perpendicular to the aft side surface.

3. The arrangement of claim 2, wherein the flap member extends in a vertical direction along a substantial part of the aft side surface and entirely along the underwater portion of the aft side surface.

4. The arrangement of claim 1, further comprising movement members, wherein the movement members adjust the flap members while the ship is in motion.

5. The arrangement of claim 1, wherein the at least one flap member comprises at least two flap members.

6. The arrangement of claim 5 wherein the at least one flap member interacts with the propulsion member in th dynamic control of the ship hull.

7. The arrangement of claim 1, wherein the at least one flap member is rotatable about an axis that extends substantially parallel to the length of the vessel hull.

8. The arrangement of claim 1, wherein the at least one flap member is movable to the deployed position via substantially linear motion.

9. An arrangement for dynamic control of the movements and course of a high-speed ship, the arrangement comprising:
    a high-speed ship hull having at least a stern and an aft side surface;
    at least one propulsion member to propel the hull at a speed in excess of 15
    at least one flap member having a fornt surface facing toward a water flow, the flap member being adjustable so that in a deployed position, the front surface is at an angle in relation to the water flow and relative to the aft side surface of the ship hull, so as to generate water flow force components acting toward the ship hull and toward the front side of the flap member to bring about a change in the movement or course of the ship;
    the propulsion member being provided with a water-jet unit for changing course;
    the ship hull having more than two aft side surfaces, each with an underwater portion submerged below a water surface while the ship is in motion;
    at least two of the aft side surfaces forming, at one end, transitions to the stern of the ship hull;
    the at least one flap member being adjustable, while the ship is in motion, between a non-deployed position, substantially in line with the aft side surface and the deployed position, projecting substantially perpendicular to the aft side surface; and
    at least one spray strip and at least one fin,
    the at least one spray strip, while the ship is in motion, forming an angle with the flap member above the water surface to prevent water splashing upwards and to influence the force components which act on the flap member and the ship hull; and
    the fin, while the ship is in motion, forming an angle with the flap member below the water surface to influence the force components acting on the flap member.

* * * * *

UNITED STATES PATENT AND TRADEMARK OFFICE
CERTIFICATE OF CORRECTION

PATENT NO.     : 6,520,104 B1
DATED          : February 18, 2003
INVENTOR(S)    : Björn Svensson It is certified that error appears in the above-identified patent and that said Letters Patent is hereby corrected as shown below:

<u>Title page</u>,
Item [57], ABSTRACT,
Line 21, "water-free stem" should read -- water-free stern --.

<u>Column 8</u>,
Line 16, "claim 5" should read -- claim 2 --.
Line 17, "th" should read -- the --.
Line 32, insert -- knots; -- after "15".
Line 33, "fornt" should read -- front --.

Signed and Sealed this

Ninth Day of September, 2003

JAMES E. ROGAN
*Director of the United States Patent and Trademark Office*